United States Patent
Tsuji et al.

(10) Patent No.: US 7,916,509 B2
(45) Date of Patent: Mar. 29, 2011

(54) POWER SUPPLY WITH REDUCED SWITCHING LOSSES BY DECREASING THE SWITCHING FREQUENCY

(75) Inventors: Tsuneo Tsuji, Mie (JP); Yoshihiko Miyamoto, Mie (JP)

(73) Assignee: Panasonic Corporation, Osaka (JP)

( * ) Notice: Subject to any disclaimer, the term of this patent is extended or adjusted under 35 U.S.C. 154(b) by 475 days.

(21) Appl. No.: 12/066,116

(22) PCT Filed: Nov. 9, 2006

(86) PCT No.: PCT/JP2006/322344
§ 371 (c)(1),
(2), (4) Date: Mar. 7, 2008

(87) PCT Pub. No.: WO2007/055265
PCT Pub. Date: May 18, 2007

(65) Prior Publication Data
US 2009/0141525 A1    Jun. 4, 2009

(30) Foreign Application Priority Data

Nov. 11, 2005    (JP) .................................. 2005-327213

(51) Int. Cl.
*H02M 7/539* (2006.01)
(52) U.S. Cl. ........................................... 363/97; 363/40
(58) Field of Classification Search ............... 363/95, 363/97, 98, 79, 131, 132, 40–41
See application file for complete search history.

(56) References Cited

U.S. PATENT DOCUMENTS

| | | | | |
|---|---|---|---|---|
| 4,347,558 | A * | 8/1982 | Kalinsky | 363/17 |
| 6,130,831 | A * | 10/2000 | Matsunaga | 363/98 |
| 6,744,649 | B1 * | 6/2004 | Yang et al. | 363/98 |
| 7,176,663 | B2 | 2/2007 | Takimoto et al. | |

FOREIGN PATENT DOCUMENTS

| | | |
|---|---|---|
| JP | 10-295086 | 11/1998 |
| JP | 10-295086 A | 11/1998 |
| JP | 2002-343542 A | 11/2002 |
| JP | 2004-88818 A | 3/2004 |
| JP | 2005-327213 | 10/2010 |
| TW | 225726 B | 7/1992 |

OTHER PUBLICATIONS

International Search Report for PCT/JP2006/322344, dated Dec. 26, 2006.

* cited by examiner

*Primary Examiner* — Harry Behm
(74) *Attorney, Agent, or Firm* — RatnerPrestia (57) ABSTRACT

A power source device includes an input terminal, a first switching element connected to the input terminal, a second switching element connected to the first switching element, a transformer having a primary coil connected to a connecting node between the first and second switching elements, a low-pass filter including a series body of a coil and a capacitor connected to a secondary coil of the transformer, an output terminal connected to a connecting node between the coil and the capacitor, a comparator having a first input terminal connected to the output terminal, and an alternating signal generator connected to a second terminal of the comparator. An output terminal of the comparator is connected to each control terminal of the first switching element and the second switching element via the temporary amplitude generation permissible section.

4 Claims, 11 Drawing Sheets

POWER SUPPLY WITH REDUCED SWITCHING LOSSES BY DECREASING THE SWITCHING FREQUENCY

This application is a U.S. National Phase Application of PCT International Application PCT/JP2006/322344.

TECHNICAL FIELD

The present invention relates to a power source device used in a printer and the like.

BACKGROUND ART

Figure 9:
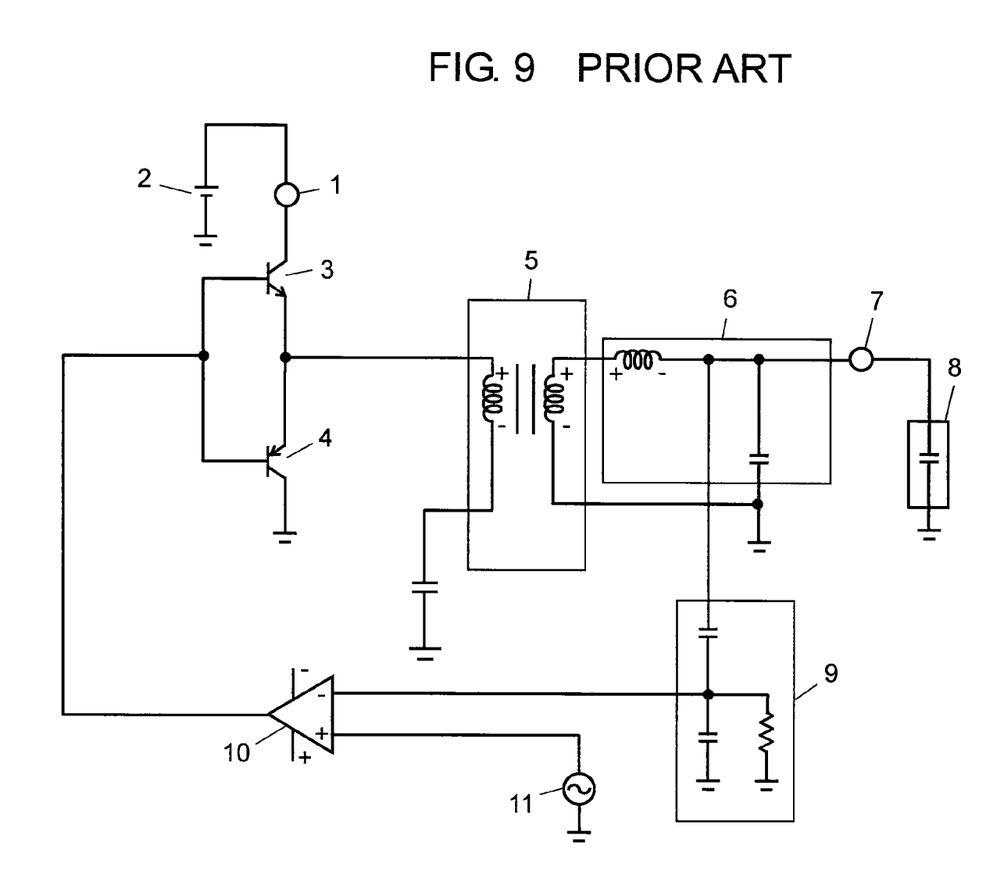
FIG. 9 is a circuit diagram illustrating a configuration of a conventional power source device.

Conventionally, a power source device of this kind is disclosed in Japanese Patent Application Unexamined Publication No. H10-295086. FIG. 9 is a circuit diagram illustrating a configuration of a conventional power source device. As shown in FIG. 9, transistors 3 and 4 are connected to DC power source 2 via input terminal 1, and output terminal 7 and load 8 such as a roller of a printer are connected to a connecting node between transistors 3 and 4 via transformer 5 and low-pass filter 6.

Figure 10:
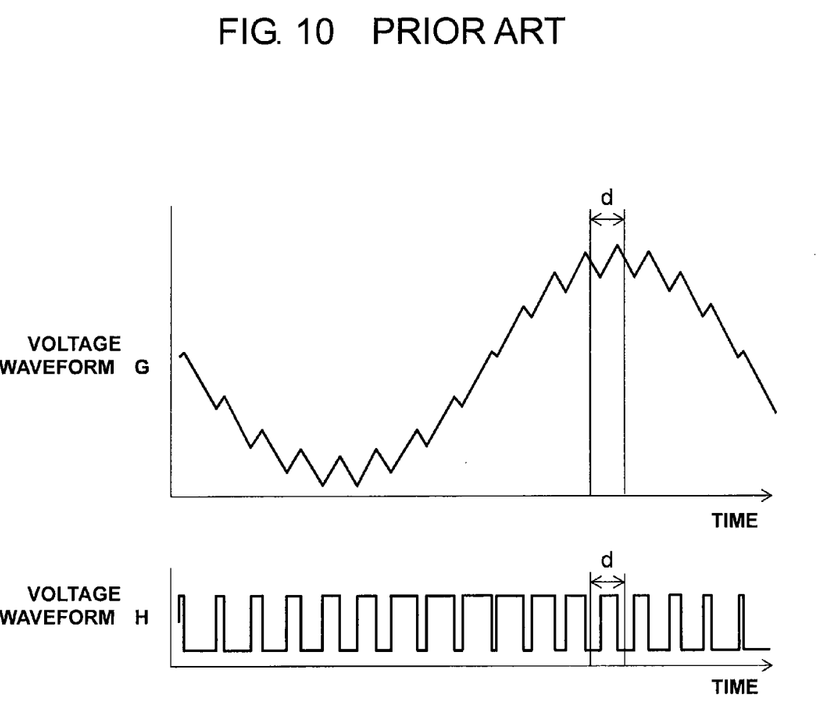
FIG. 10 shows ideal voltage waveforms to illustrate an operation of a conventional power source device.

Next, an operation of a conventional power source device configured as mentioned above is described. FIG. 10 shows ideal voltage waveforms to illustrate an operation of a conventional power source device. Voltage waveform G of output terminal 7 as shown in FIG. 10 is detected by voltage detecting circuit 9 and input into a negative input end of comparator 10, and an ideal alternating output voltage signal from alternating signal generator 11 is input into a positive input end of comparator 1, thereby carrying out comparison. Then, comparator 10 can obtain an output voltage having ideal pulse-like voltage waveform H as shown in FIG. 10. By inputting this output voltage into a base of transistors 3 and 4, a voltage of DC power source 2 is made into a pulse form, and the feed-back voltage is input into transformer 5.

Such a conventional power source device has had a problem of a switching loss in a switching element. That is to say, in a power source device having a conventional configuration, a voltage is actually applied to each input end of comparator 10 in a way in which a noise voltage such as a ripple voltage is superimposed in addition to an ideal voltage waveform from voltage detecting circuit 9 and alternating signal generator 11. As a result, ideal pulse-like voltage waveform H shown in FIG. 10 may be changed.

Figure 11:
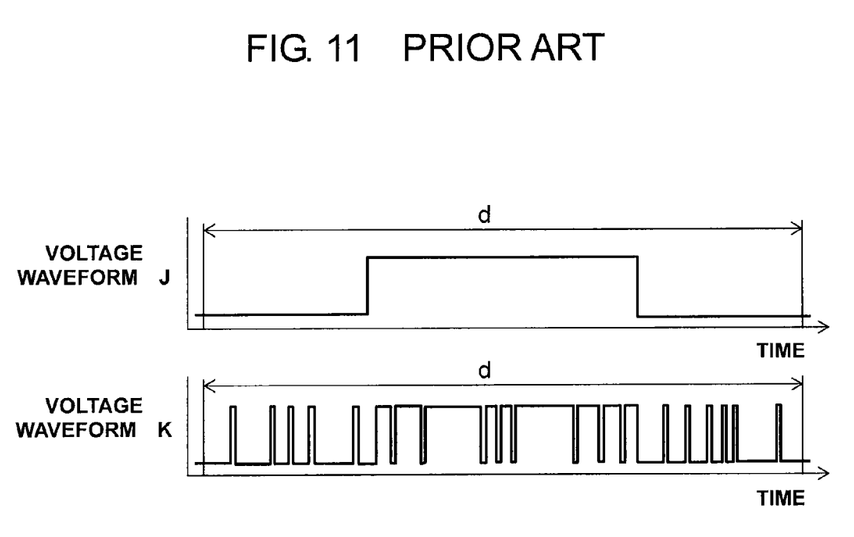
FIG. 11 is an enlarged view showing voltage waveforms to illustrate an operation of a conventional power source device.

This situation is described in detail with reference to FIG. 11. FIG. 11 is an enlarged view showing a voltage waveform to illustrate an operation of a conventional power source device. FIG. 11 is an enlarged view showing time interval "d" shown in FIG. 10. Although comparator 10 should obtain an output voltage of ideal pulse-like voltage waveform J as shown in FIG. 11, it actually obtains voltage waveform K having a large number of pulse-like waveforms in time interval "d". Then, voltage waveform K is input into the base of switching elements 3 and 4. As a result, switching elements 3 and 4 carry out unnecessary switching operations. For example, transistor 3 carries out switching operations at times corresponding to the number of logical values high of voltage waveform K shown in FIG. 11, and transistor 4 carries out switching operations at times corresponding to the number of logical values low thereof. Accordingly, a switching loss is increased.

SUMMARY OF THE INVENTION

A power source device of the present invention includes an input terminal, a first switching element connected to the input terminal, a second switching element connected to the first switching element, a transformer including a primary side connected to a connecting node between the first and second switching elements, a low-pass filter including a series body of a coil and a capacitor connected to a secondary side of the transformer, an output terminal connected to a connecting node between the coil and the capacitor, a comparator having a first input end connected to the output terminal, and an alternating signal generator connected to a second input end of the comparator. An output terminal of the comparator is connected to control terminals of the first and second switching elements via a temporary amplitude generation permissible section.

According to such a configuration, by providing the temporary amplitude generation permissible section between the output end of the comparator and the control terminals of the first and second switching elements, an unnecessary switching operation is reduced and thus a switching loss can be reduced.

REFERENCE MARKS IN THE DRAWINGS 12 input terminal
14 first switching element (npn type transistor)
15 second switching element (pnp type transistor)
16 transformer
19 low-pass filter
20 output terminal
25 comparator 26 alternating signal generator
31 temporary amplitude generation permissible section

DETAILED DESCRIPTION OF THE PREFERRED EMBODIMENTS

Hereinafter, the exemplary embodiments of the present invention are described with reference to drawings.

First Exemplary Embodiment

Figure 1:
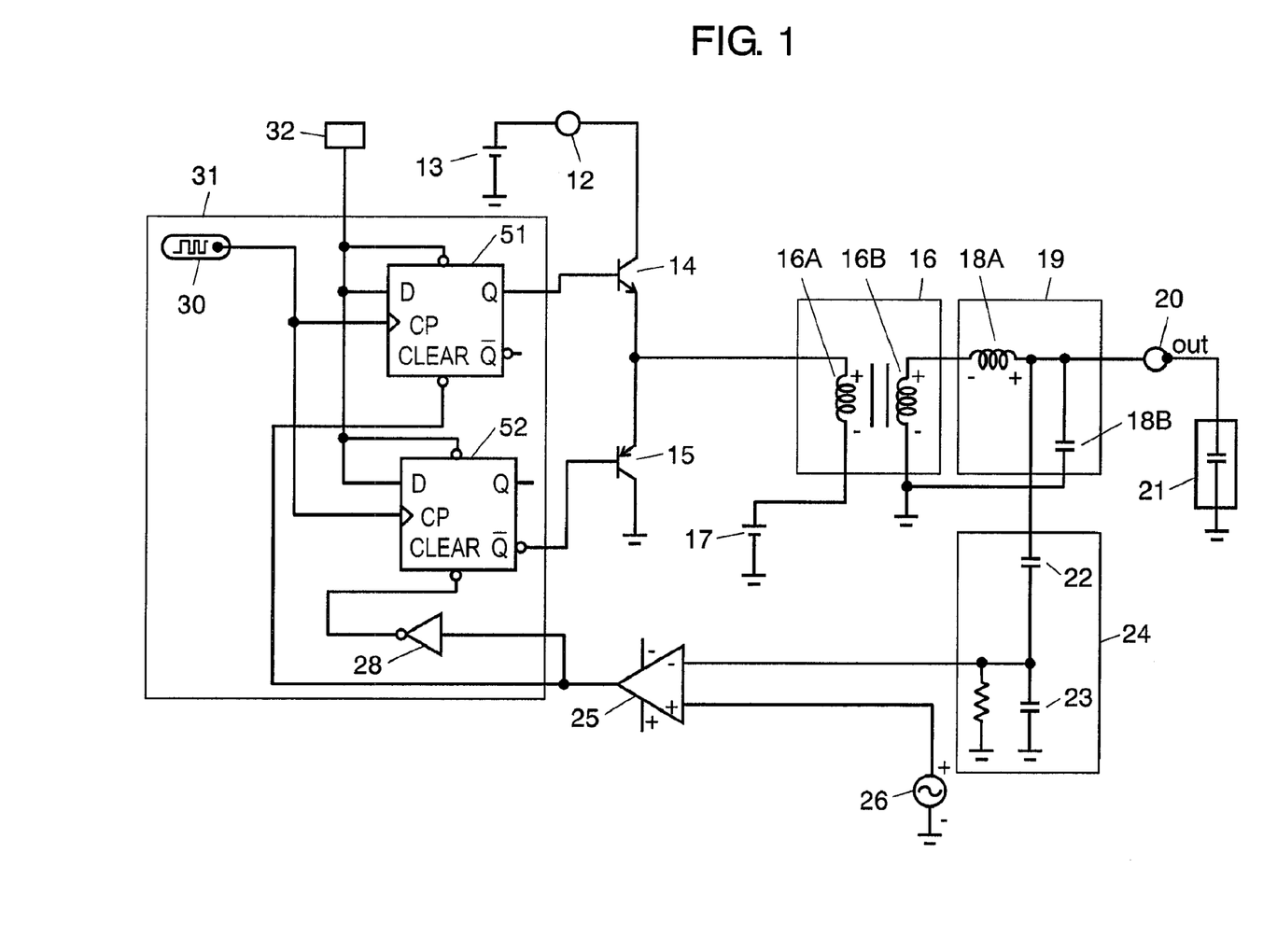
FIG. 1 is a circuit diagram illustrating a configuration of a power source device in accordance with a first exemplary embodiment of the present invention.

Hereinafter, a power source device in accordance with a first exemplary embodiment of the present invention is described with reference to drawings. FIG. 1 is a circuit diagram illustrating a configuration of a power source device in accordance with the first exemplary embodiment of the present invention. As shown in FIG. 1, in the power source device of the first exemplary embodiment, a collector of npn type transistor 14 as a first switching element is connected to DC power source 13 via input terminal 12. To an emitter of transistor 14, an emitter of pnp type transistor 15 is connected. A collector of transistor 15 is connected to the ground. Primary coil 16A of transformer 16 is connected to a connecting node between transistors 14 and 15. To the other end of primary coil 16A, reference voltage element 17 is connected.

On the other hand, low-pass filter 19 including a series circuit of coil 18A and capacitor 18B is connected to secondary coil 16B of transformer 16. A connecting node between the other end of secondary coil 16B of transformer 16 and the other end of capacitor 18B is connected to the ground. Output terminal 20 is connected to a connecting node between coil 18A and capacitor 18B. Load 21 such as a charging roller of a printer is connected to output terminal 20.

Output terminal 20 is connected to a negative input end as a first input end of comparator 25 via voltage detecting circuit 24 including a series body of capacitors 22 and 23. An alternating signal generator 26 for outputting an ideal alternating output voltage signal is connected to a positive input end as a second input end of comparator 25. An output terminal of comparator 25 is input into temporary amplitude generation permissible section 31 that determines logical value high and logical value low of base potentials of transistors 14 and 15.

Temporary amplitude generation permissible section 31 includes pulse generator 30, D flip-flop (Delay Flip-flop) 51 as a first flip-flop circuit with a CP (clock pulse) input terminal connected to pulse generator 30, and D flip-flop 52 as a second flip-flop circuit with a CP input terminal connected to pulse generator 30. The output terminal of comparator 25 is connected to a clear input terminal of D flip-flop 51 and an input terminal of logical NOT (hereinafter, referred to as "NOT") circuit 28. An output terminal of NOT circuit 28 is connected to a clear input terminal of D flip-flop 52. Furthermore, the base as a control terminal of transistor 14 is connected to a forward output terminal of D flip-flop 51, and the base as a control terminal of transistor 15 is connected to a reverse output terminal of D flip-flop 52. Terminal 32 having logical value high is always connected to D input terminals of D flip-flops 51 and 52.

Next, a principle of an operation of the thus configured power source device is described. Firstly, an electric current generated from DC power source 13 flows toward the collector of transistor 14 via input terminal 12. An operation when the base potentials of transistors 14 and 15 are shifted to logical value high and logical value low is described below in detail. Briefly, however, the power source device of this exemplary embodiment is designed so that when the base potential of transistor 14 is logical value high, the base potential of transistor 15 is also logical value high, and, on the contrary, when the base potential of transistor 14 is logical value low, the base potential of transistor 15 is also logical value low.

When the base potentials of both transistors 14 and 15 are logical value high, the collector and the emitter are in conduction in npn type transistor 14, and the collector and the emitter are out of conduction in pnp type transistor 15. In this state, an electric current generated from DC power source 13 flows in the collector and the emitter of transistor 14 to reference voltage element 17. At this time, an electric current flows into primary coil 16A of transformer 16 in the direction from the anode to the cathode, and the anode of secondary coil 16B is induced to have a positive potential.

On the other hand, when the bases of both transistors 14 and 15 are logical value low, the collector and the emitter are out of conduction in npn type transistor 14, and the collector and the emitter are in conduction in pnp type transistor 15. In this state, an electric current from reference voltage element 17 flows between the emitter and the collector and to the ground to which the corrector of transistor 15 is connected. At this time, an electric current flows in primary coil 16A of transformer 16 in the direction from the cathode to the anode, and the anode of secondary coil 16B is induced to have a negative potential.

Thus, a voltage waveform generated at both ends of secondary coil 16B is smoothed by low-pass filter 19 including coil 18A and capacitor 18B, so that a high frequency part is removed. The voltage waveform shown by a sine curve in FIG. 10 is obtained and output to output terminal 20.

Figure 2:
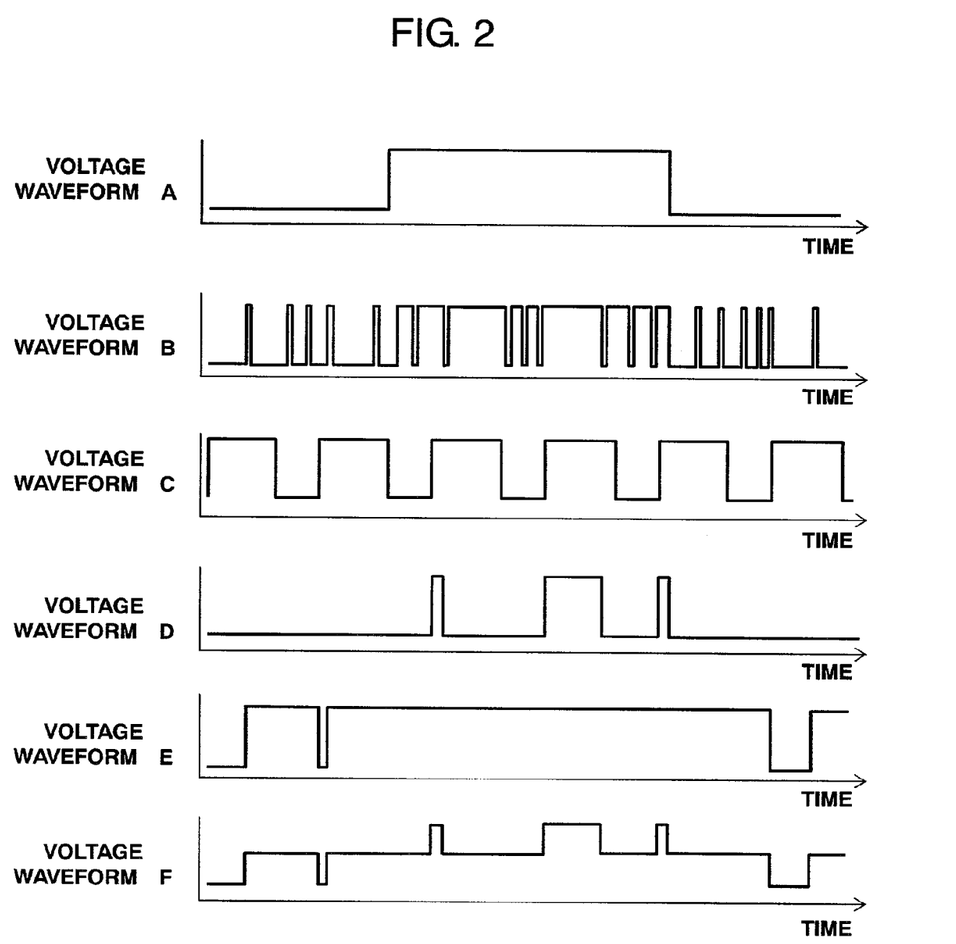
FIG. 2 is an enlarged view showing voltage waveforms to illustrate an operation of a power source device in accordance with the first exemplary embodiment of the present invention.

Hereinafter, an operation of a voltage waveform of each part of the power source device is described with reference to drawings. FIG. 2 is an enlarged view showing voltage waveforms to illustrate an operation of the power source device in accordance with the first exemplary embodiment of the present invention.

A voltage waveform of output terminal 20 is divided by capacitors 22 and 23 constituting voltage detecting circuit 24. Then, a voltage at both ends of capacitor 23 is input into the negative input end of comparator 25. On the other hand, an ideal alternating voltage waveform (not including an effect of a ripple voltage from voltage detecting circuit 24 and alternating signal generator 26) generated from alternating signal generator 26 is input to the positive input end of comparator 25.

Then, the output of comparator 25 is logical value high when the voltage from alternating signal generator 26 is higher than the voltage at both ends of capacitor 23, and the output of comparator 25 is logical value low when the voltage from alternating signal generator 26 is lower than the voltage at both ends of capacitor 23. The output waveform of comparator 25 should be voltage waveform A in FIG. 2. However, because the effect of a ripple voltage from voltage detecting circuit 24 and alternating signal generator 26 is added, the output waveform of comparator 25 includes a large number of pulse waveforms as shown in voltage waveform B of FIG. 2.

Voltage waveform B is input into temporary amplitude generation permissible section 31 for determining logical value high and logical value low of the base potentials of transistors 14 and 15. Specifically, voltage waveform B is input into the clear input terminal of D flip-flop 51 and the input terminal of NOT circuit 28 constituting temporary amplitude generation permissible section 31. The output terminal of NOT circuit 28 is connected to the clear input terminal of D flip-flop 52. Furthermore, voltage waveform C in FIG. 2 that is an output signal of pulse generator 30 is input to the CP input terminal of D flip-flop 51 and the CP input terminal of D flip-flop 52. Then, logical value high and logical value low of the base potential of transistor 14 are determined by the forward output terminal of D flip-flop 51, and logical value high and logical value low of the base potential of transistor 15 are determined by the reverse output terminal of D flip-flop 52.

For example, when voltage waveform B output from comparator 25 is logical value high and voltage waveform C output from pulse generator 30 is shifted from a state of logical value low to a state of logical value high, voltage waveform D output from the forward output terminal of D flip-flop 51 becomes a state of logical value high. Then, this state of logical value high continues and transistor 14 continues to be ON until the output of comparator 25 becomes logical value low.

During the time, a signal of logical value low continues to be input to the clear input terminal of D flip-flop 52 from reverse circuit 28. Voltage waveform E output from the reverse output terminal of D flip-flop 52 maintains a state of logical value high. Therefore, when the output of comparator 25 is in a state of logical value low, that is, until a signal of logical value high is input from reverse circuit 28, transistor 15 continues to be OFF.

On the other hand, when voltage waveform B output from comparator 25 is in a state of logical value low, that is, when the output of reverse circuit 28 is in a state of logical value high, and when voltage waveform C output from pulse generator 30 is shifted from a state of logical value low to a logical value high, voltage waveform E output from the reverse output terminal of D flip-flop 52 becomes a state of logical value low. Therefore, until the output of comparator 25 becomes in a state of logical value high, that is, the output of reverse circuit 28 becomes a state of logical value low, transistor 15 continues to be ON.

During the time, a signal of logical value low continues to be input to the clear input terminal of D flip-flop 51. The forward output terminal of D flip-flop 51 maintains a state of logical value low. Therefore, transistor 14 continues to be OFF until the output of comparator 25 becomes a state of logical value high.

When such a signal is input into the bases of transistors 14 and 15, respectively, voltage waveform F shown in FIG. 2 is input into primary coil 16A of transformer 16.

Thus, even if a ripple voltage and the like is applied to the output of comparator 25, transistors 14 and 15 do not carry out switching operations at times corresponding to the number of logical values high and logical values low in voltage waveform B shown in FIG. 2. Instead, only when pulse generator 30 in temporary amplitude generation permissible section 31 is shifted from a state of logical value low to a state of logical value high, any one of transistors 14 and 15 is turned ON. Moreover, when the output of comparator 25 is reversed, until the output of pulse generator 30 is shifted from a state of logical value low to a logical value high, both of transistors 14 and 15 are turned OFF. Therefore, the number of switching operations of transistors 14 and 15 can be limited to not more than the frequency of pulse generator 30, thus enabling a switching loss of transistors 14 and 15 to be reduced.

Note here that it is possible to substitute a leakage inductance of transformer 16 for coil 18A.

Furthermore, it is possible to substitute a capacity component of load 21 connected to outer terminal 20 for capacitor 18B.

Second Exemplary Embodiment

Figure 3:
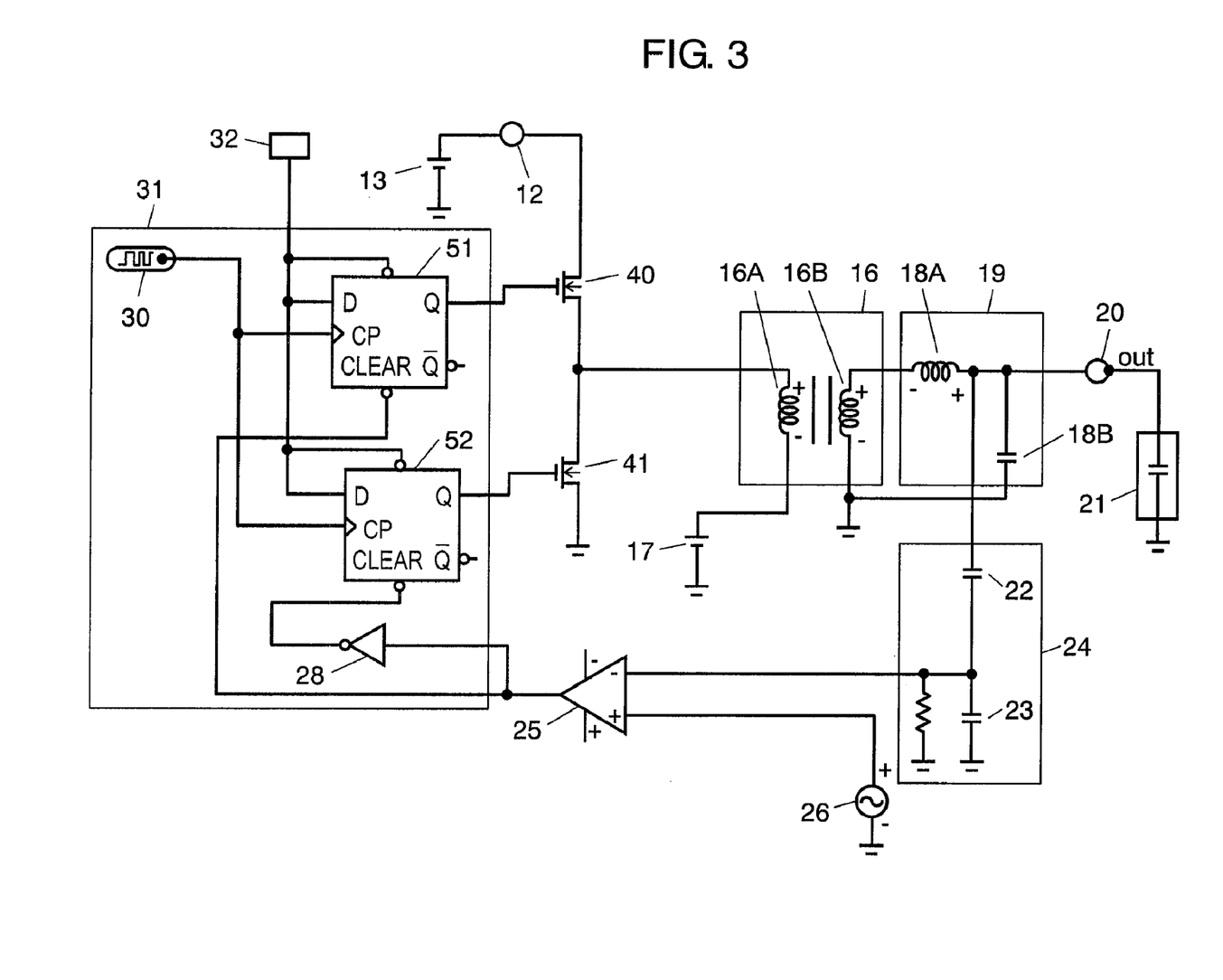
FIG. 3 is a circuit diagram illustrating a configuration of a power source device in accordance with a second exemplary embodiment of the present invention.

Hereinafter, a power source device in accordance with a second exemplary embodiment of the present invention is described with reference to drawings. FIG. 3 is a circuit diagram illustrating a configuration of a power source device in accordance with the second exemplary embodiment of the present invention. Note here that the same reference numerals are given to the same configurations as those of the first exemplary embodiment and the description therefor is omitted.

As shown in FIG. 3, the power source device of the second exemplary embodiment is characterized in that a drain of N type FET 40 is connected to input terminal 12, a source of N type FET 40 is connected to a drain of N type FET 41, and a forward output terminal of D flip-flop 52 instead of a reverse output terminal of D flip-flop 52 is connected to a gate of N type FET 41. Since it is possible to allow an electric current to flow between the drain and a source of N type FET 41 when the gate thereof is in a state of logical value high, not a reverse output terminal but the forward output terminal of D flip-flop 52 is connected.

According to such a configuration, since N type FETs 40 and 41 having faster switching speeds than those of transistors are used, a switching loss can be reduced.

Furthermore, since N type FETs 40 and 41 have a parasitic diode, a junction point between the source of N type FET 40 and the drain of N type FET 41 does not have a potential that is higher than that of DC power source 13 or that is lower than that of the ground. Thus, the withstand voltage to the counter-electromotive voltage from transformer 16 can be maintained.

Figure 4:
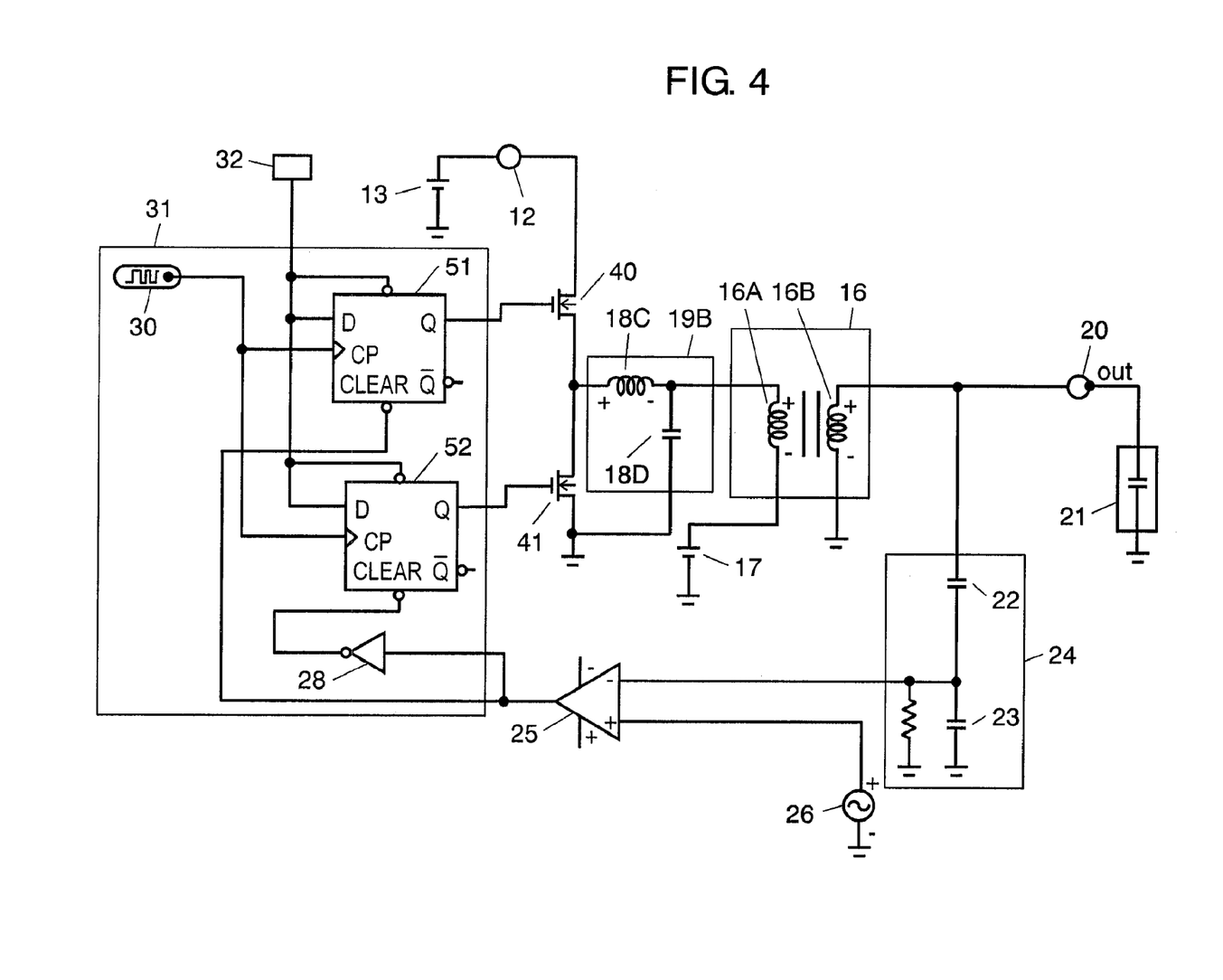
FIG. 4 is a circuit diagram showing a modification example of a power source device in accordance with the second exemplary embodiment of the present invention.

Note here that instead of low-pass filter 19 shown in FIG. 3, low-pass filter 19B including coil 18C and capacitor 18D as shown in FIG. 4 may be provided. That is to say, the anode of coil 18C is connected to a source of N type FET 40, the cathode of coil 18C is connected to primary coil 16A of transformer 16, one end of capacitor 18D is connected to primary coil 16A of transformer 16, and the other end of capacitor 18D is connected to a source of N type FET 41. Thus, low-pass filter 19B is configured.

Thus, the power source device in accordance with the second exemplary embodiment of the present invention includes input terminal 12, N type FET 40 as a first switching element connected to input terminal 12, N type FET 41 as a second switching element connected to N type FET 40, low-pass filter 19B including a series body of coil 18C and capacitor 18D connected to a connecting node between N type FETs 40 and 41, transformer 16 having a primary side connected to a connecting node between coil 18C and capacitor 18D, output terminal 20 connected to a secondary side of transformer 16, comparator 25 having a first input end connected to output terminal 20, and alternating signal generator 26 connected to a secondary input end of comparator 25. The output terminal of comparator 25 is connected to control terminals of N type FETs 40 and 41 via temporary amplitude generation permissible section 31.

According to such a configuration, when transformer 16 is a step-up transformer, the merit of providing low-pass filter 19B not at the secondary side but at the primary side is described below. Firstly, in the case of a step-up transformer, since the amount of flowing electric current in primary coil 16A is larger than that in secondary coil 16B, by coil 18C in low-pass filter 19B, it is not necessary to radically restrict the amount of electric current. Thus, an inductance of coil 18C can be reduced. Therefore, the number of winding coil 18C can be reduced, and thus the size thereof can be reduced. Furthermore, when the number of winding of coil 18C is reduced, a capacity between windings can be reduced, and thus an electric current flowing in the capacity between windings can be reduced. Thus, a loss can be reduced. Furthermore, in the step-up transformer, the voltage at the primary side is low, it is possible to reduce an insulating distance between low-pass filter 19B and surrounding components can be reduced.

Third Exemplary Embodiment

Figure 5:
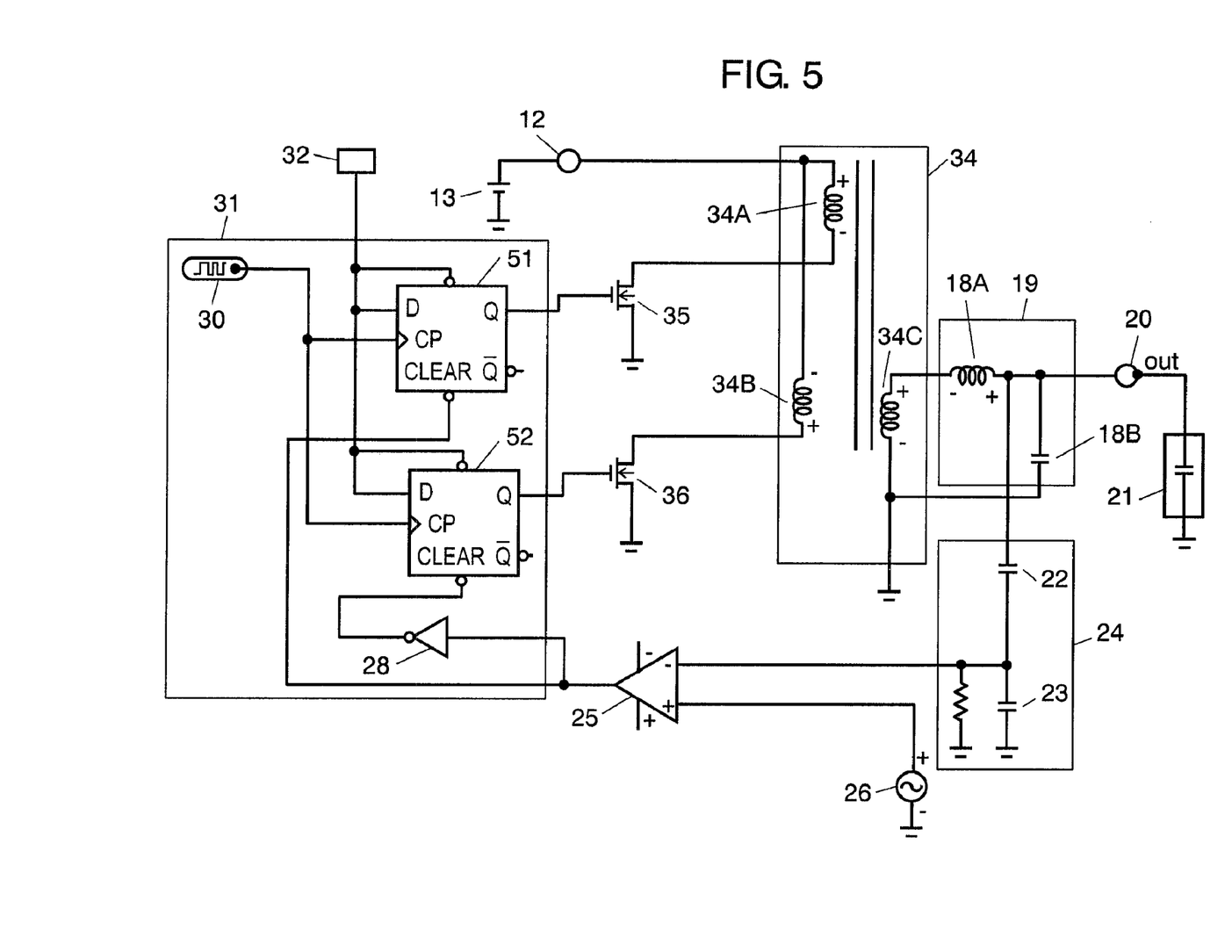
FIG. 5 is a circuit diagram illustrating a configuration of a power source device in accordance with a third exemplary embodiment of the present invention.

Hereinafter, a power source device in accordance with a third exemplary embodiment of the present invention is described with reference to drawings. FIG. 5 is a circuit diagram illustrating a configuration of a power source device in accordance with the third exemplary embodiment of the present invention. Note here that the same reference numerals are given to the same configurations as those of the second exemplary embodiment and the description therefor is omitted.

As shown in FIG. 5, the power source device of the third exemplary embodiment is characterized in that transformer 34 including two primary coils 34A and 34B and one secondary coil 34C is connected to input terminal 12, the anode of primary coil 34A and the cathode of primary coil 34B are connected to input terminal 12; and the cathode of primary coil 34A is connected to a drain of N type FET 35 and the anode of primary coil 34B is connected to a drain of N type FET 36.

Next, an operation of the thus configured power source device of the third exemplary embodiment is described. When a voltage from alternating signal generator 26 is higher than a voltage at both ends of capacitor 23, an output of comparator 25 is in a state of logical value high. When pulse generator 30 is shifted from a state of logical value low to a state of logical value high, an output of a forward output terminal of D flip-flop 51 becomes logical value high. When the output of the forward output terminal of D flip-flop 51 becomes logical value high, the output is input into a gate of N type FET 35. As a result, the drain and a source of N type FET 35 are in conduction, and an electric current flows from DC power source 13 to the ground to which a source of N type FET 35 is connected. At this time, an electric current flows to primary coil 34A of transformer 34 in the direction from the anode to the cathode, and the anode of secondary coil 34C is induced to have a positive potential.

On the other hand, when the voltage from alternating signal generator 26 is lower than the voltage at both ends of capacitor 23, the output of comparator 25 is logical value low. When pulse generator 30 is shifted from a state of logical value low to a state of logical value high, an output of a forward output terminal of D flip-flop 52 becomes logical value high. When the output of the forward output terminal of D flip-flop 52 becomes logical value high, the output is input into a gate of N type FET 36. As a result, the drain and a source of N type FET 36 are in conduction, and an electric current flows from DC power source 13 to the ground to which the source of N type FET 36 is connected. At this time, an electric current flows to primary coil 34B of transformer 34 in the direction from the cathode to the anode, and the anode of secondary coil 34C is induced to have a negative potential.

Thus, since the power source device of the third exemplary embodiment includes two primary coils 34A and 34B in which the anode and cathode are connected to each other, the voltage amplitude at a primary side is twice higher. Therefore, even when the number of winding of secondary coil 34C is reduced by half, the output of the same potential can be obtained. Then, since the voltage amplitude becomes twice higher, even when the amount of electric current is reduced by half, the same electric power can be obtained. Therefore, the amount of electric current flowing in primary coils 34A and 34B can be reduced by half. As a result, the temperature rise of primary coils 34A and 34B and N type FETs 35 and 36 can be reduced.

Fourth Exemplary Embodiment

Figure 6:
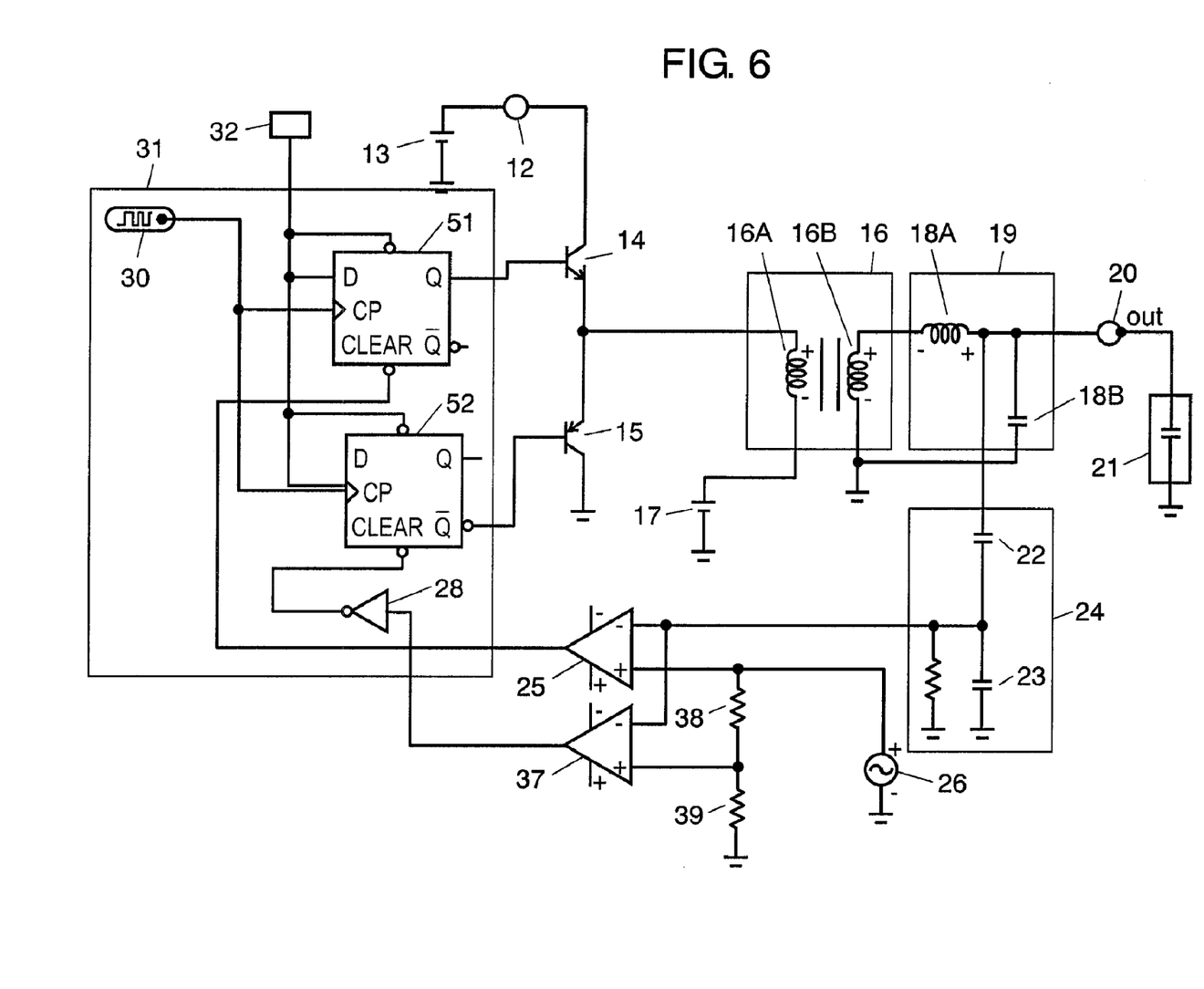
FIG. 6 is a circuit diagram illustrating a configuration of a power source device in accordance with a fourth exemplary embodiment of the present invention.

Hereinafter, a power source device in accordance with a fourth exemplary embodiment of the present invention is described with reference to drawings. FIG. 6 is a circuit diagram illustrating a configuration of a power source device in accordance with a fourth exemplary embodiment of the present invention. Note here that the same reference numerals are given to the same configurations as those of the first exemplary embodiment and the description therefor is omitted.

As shown in FIG. 6, the power source device of the fourth exemplary embodiment is characterized in that not only a negative input end of comparator 25 but also a negative input end of comparator 37 is connected to a connecting node between capacitor 22 and capacitor 23, and that resistors 38 and 39 for dividing a voltage from alternating signal generator 26 is connected to a positive input end of comparator 37. Furthermore, an output terminal of comparator 25 is not connected to NOT circuit 28. It is connected to only a clear input terminal of D flip-flop 51. To an input terminal of NOT circuit 28, an output terminal of comparator 37 is connected.

Next, an operation of the thus configured power source device of the fourth exemplary embodiment is described. When a voltage from alternating signal generator 26 is higher than a voltage of both ends of capacitor 23, the output of comparator 25 is in a state of logical value high. When pulse generator 30 is shifted from a state of logical value low to a state of logical value high, an output of a forward output terminal of D flip-flop 51 becomes logical value high, and a base of npn type transistor 14 becomes in a state of logical value high.

On the other hand, when a voltage at both ends of register 39, which is divided voltage of alternating signal generator 26, is lower than the voltage at both ends of capacitor 23, the output of comparator 37 is logical value low. When pulse generator 30 is shifted from a state of logical value low to a state of logical value high, an output of a reverse output terminal of D flip-flop 52 becomes a state of logical value low, and a base of pnp type transistor 15 becomes in a state of logical value low.

Thus, in the configuration of the power source device of the fourth exemplary embodiment, the base of transistor 15 is made to be logical value low not when the voltage of alternating signal generator 26 is even a little lower than the voltage at both ends of capacitor 23. Instead, the base of transistor 15 is made to be logical value low for the first time when the voltage is lower than the divided voltage at both ends of resistor 39. Therefore, when the voltage at both ends of capacitor 23 is not lower than the voltage at both ends of resistor 39 and not higher than the voltage of alternating signal generator 26, both transistors 14 and 15 are turned OFF. Thus, unnecessary switching operations can be reduced.

Fifth Exemplary Embodiment

Figure 7:
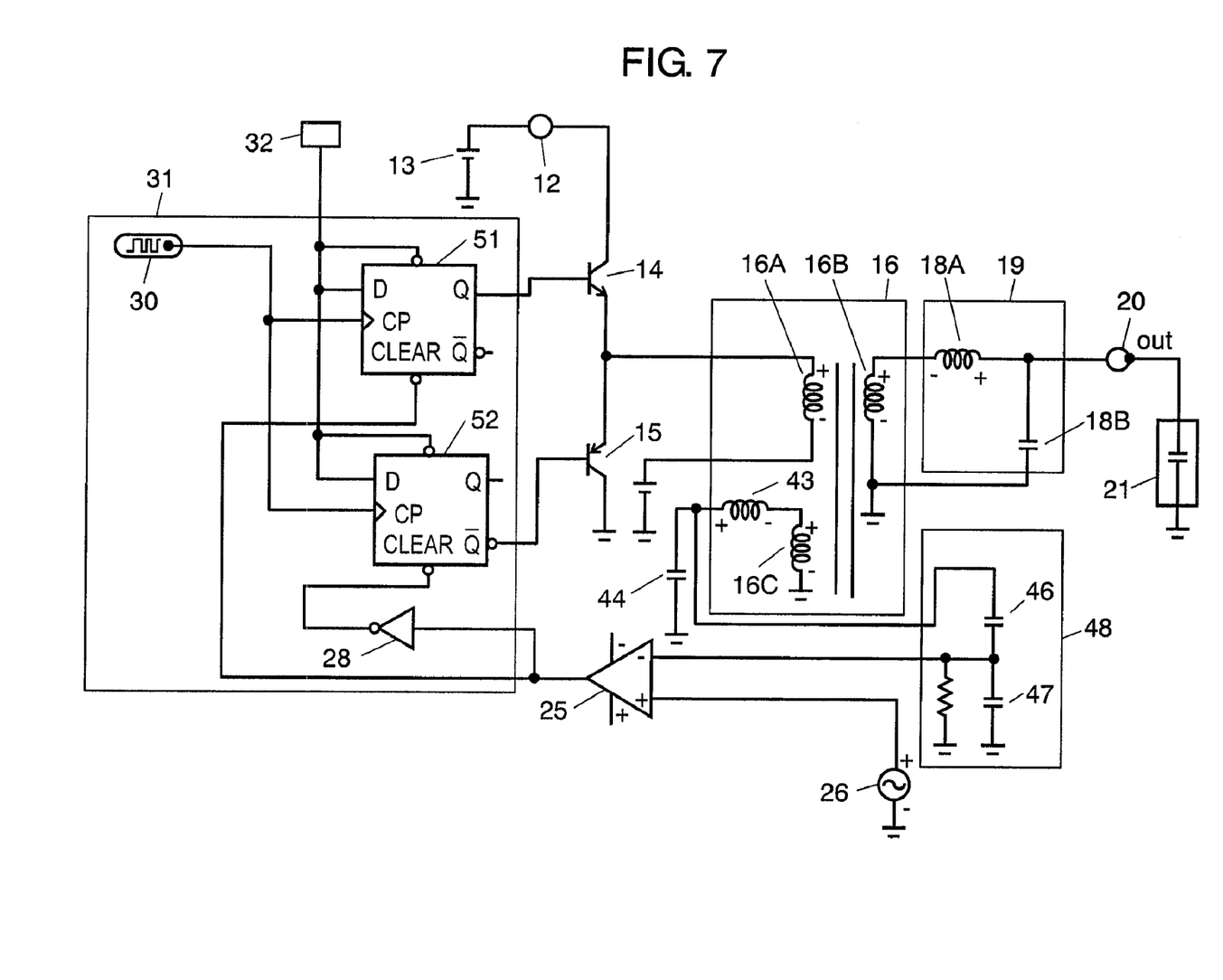
FIG. 7 is a circuit diagram illustrating a configuration of a power source device in accordance with a fifth exemplary embodiment of the present invention.

Hereinafter, a power source device in accordance with a fifth exemplary embodiment of the present invention is described with reference to drawings. FIG. 7 is a circuit diagram illustrating a configuration of a power source device in accordance with the fifth exemplary embodiment of the present invention. Note here that the same reference numerals are given to the same configurations as those of the first exemplary embodiment and the description therefor is omitted.

As shown in FIG. 7, the power source device of the fifth exemplary embodiment is characterized in that control winding 16C is provided at a primary side of transformer 16, and that the cathode side of control winding 16C is connected to the ground and the anode side thereof is connected to the cathode side of coil 43. The anode of coil 43 is connected to one end of capacitor 44 and also connected to one end of capacitor 46 constituting voltage detecting circuit 48. The other end of capacitor 44 is connected to the ground and the other end of capacitor 46 is connected to capacitor 47. Then, a connecting node between capacitor 46 and capacitor 47 is connected to a negative input end of comparator 25.

Thus, in the configuration of the power source device of the fifth exemplary embodiment, voltage detector 48 does not directly receive a voltage of output terminal 20 but voltage detector 48 receives a voltage from control winding 16C, which virtually detects an output voltage, via low-pass filter 19. Therefore, capacitor 46 does not receive the difference in potential between a secondary side and the primary side of transformer 16, so that the withstand voltage of capacitor 46 can be secured.

Sixth Exemplary Embodiment

Figure 8:
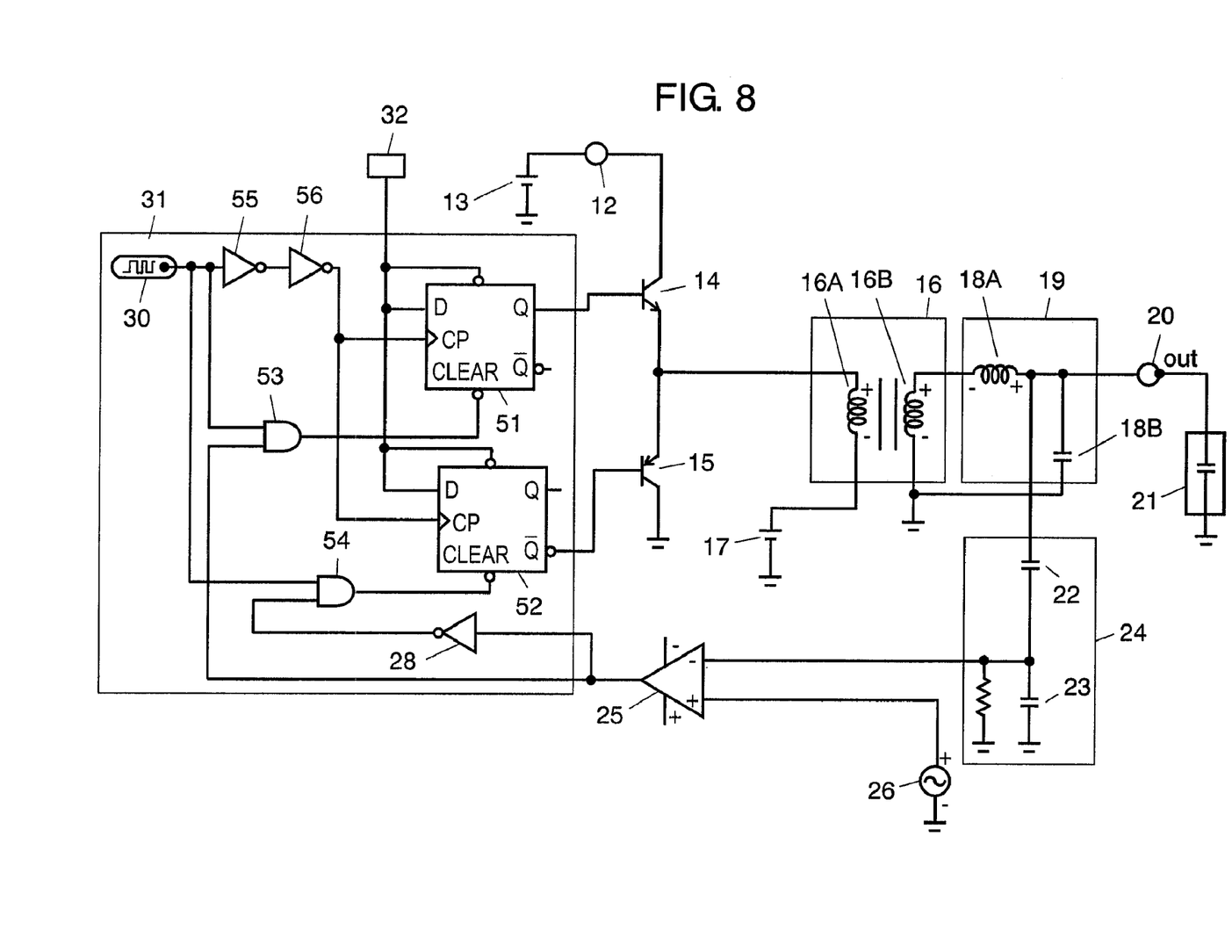
FIG. 8 is a circuit diagram illustrating a configuration of a power source device in accordance with a sixth exemplary embodiment of the present invention.

Hereinafter, a power source device in accordance with a sixth exemplary embodiment of the present invention is described with reference to drawings. FIG. 8 is a circuit diagram illustrating a configuration of a power source device in accordance with the sixth exemplary embodiment of the present invention. Note here that the same reference numerals are given to the same configurations as those of the first exemplary embodiment and the description therefor is omitted.

As shown in FIG. 8, the power source device of the sixth exemplary embodiment is characterized in that an output terminal of comparator 25 is connected to an input terminal of NOT circuit 28 and one input terminal of AND circuit 53, and an output terminal of NOT circuit 28 is connected to one input terminal of AND circuit 54. Furthermore, output terminal of pulse generator 30 is connected to the other input terminals of AND circuits 53 and 54, respectively. Then, an output of AND circuit 53 is connected to a clear input terminal of D flip-flop 51 and an output terminal of AND circuit 54 is connected to a clear input terminal of D flip-flop 52. Furthermore, pulse generator 30 is connected to CP terminals of D flip-flop 51 and D flip-flop 52 via NOT circuit 55 and NOT circuit 56 that are connected in series.

Next, an operation of the thus configured power source device of the sixth exemplary embodiment is described. AND circuit 53 compares an output signal of comparator 25 with a signal of pulse generator 30. Only when the both signals are in a state of logical value high, AND circuit 53 outputs a signal of logical value high to the clear input terminal of D flip-flop 51. Furthermore, AND circuit 54 compares an output signal of NOT circuit 28 with the signal of pulse generator 30. Only when the both signals are in a state of logical value high, AND circuit 54 outputs a signal of logical value high to the clear input terminal of D flip-flop 52.

Therefore, when the signal of pulse generator 30 is logical value low, clear input of both D flip-flops 51 and 52 are logical value low and both transistors 14 and 15 are controlled not to operate.

NOT circuits 55 and 56 are provided to delay the signal from pulse generator 30 and to input it into CP terminals of D flip-flops 51 and 52, respectively. That is to say, in order to normally operate D flip-flops 51 and 52, it is necessary to delay the time of inputting a signal to the CP terminal with respect to the time of inputting a signal to the clear input terminal. This is necessary for preventing the situation that even when the CP terminal detects that the signal from pulse generator 30 is shifted from low to high in a stage in which a high signal from pulse generator 30 does not reach the clear input terminal, the detected result is not reflected to the output since a low signal has been input in the clear input terminal in advance.

Since AND circuits 53 and 54 are interposed between pulse generator 30 and the clear input terminals of D flip-flops 51 and 52, respectively, delay is generated. Thus, NOT circuits 55 and 56 are interposed between the CP terminals of D flip-flops 51 and 52 and pulse generator 30 so as to generate delay intentionally. The input time to the CP terminal is delayed with respect to the input time to the clear terminal, thereby enabling D flip-flops 51 and 52 to be operated normally.

With such a configuration, it is possible to optimize a rest time or a cycle according to an inductance to be used for a filter or a leakage inductance of a transformer. Even when the output of comparator 25 maintains a state of logical value high or a state of logical value low for a long time, it is possible to prevent a large distortion in a waveform due to the saturation by a magnetic circuit.

INDUSTRIAL APPLICABILITY

A power source device of the present invention has effects capable of reducing unnecessary switching and reducing a switching loss and is useful in various electronic equipment such as a printer.

The invention claimed is:
1. A power source device comprising:
an input terminal;
a first switching element connected to the input terminal;
a second switching element connected to the first switching element;
a transformer having a primary coil connected to a connecting node between the first switching element and the second switching element;
a low-pass filter including a series body of a coil and a capacitor, which are connected to a secondary coil of the transformer;
an output terminal connected to a connecting node between the coil and the capacitor;
a comparator having a first input end connected to the output terminal; and
an alternating signal generator connected to a second input end of the comparator,
wherein an output terminal of the comparator is connected to each control terminal of the first switching element and the second switching element via a temporary amplitude generation permissible section; and
wherein the temporary amplitude generation permissible section comprises:
a pulse generator;
a first flip-flop circuit having a clock pulse input terminal connected to the pulse generator; and
a second flip-flop circuit having a clock pulse input terminal connected to the pulse generator; and
wherein the output terminal of the comparator is connected to each clear input terminal of the first flip-flop circuit and the second flip-flop circuit.

2. The power source device of claim 1, wherein an output terminal of the first flip-flop circuit is connected to a control terminal of the first switching element and an output terminal of the second flip-flop circuit is connected to a control terminal of the second switching element.

3. A power source device comprising
an input terminal;
a first switching element connected to the input terminal;
a second switching element connected to the first switching element;
a low-pass filter including a series body of a coil and a capacitor, which are connected to a connecting node between the first switching element and the second switching element;
a transformer having a primary coil connected to a connecting node between the coil and the capacitor;
an output terminal connected to a secondary coil of the transformer;
a comparator having a first input end connected to the output terminal; and
an alternating signal generator connected to a second input end of the comparator,
wherein an output terminal of the comparator is connected to each control terminal of the first switching element and the second switching element via a temporary amplitude generation permissible section; and
wherein the temporary amplitude generation permissible section comprises:
a pulse generator;
a first flip-flop circuit having a clock pulse input terminal connected to the pulse generator; and
a second flip-flop circuit having a clock pulse input terminal connected to the pulse generator; and
wherein the output terminal of the comparator is connected to each clear input terminal of the first flip-flop circuit and the second flip-flop circuit.

4. The power source device of claim 3, wherein an output terminal of the first flip-flop circuit is connected to a control terminal of the first switching element and an output terminal of the second flip-flop circuit is connected to a control terminal of the second switching element.

* * * * *